United States Patent

[11] 3,588,219

| [72] | Inventor | Dean Lusted<br>Norwichtown, Conn. |
|---|---|---|
| [21] | Appl. No. | 683,377 |
| [22] | Filed | Nov. 15, 1967 |
| [45] | Patented | June 28, 1971 |
| [73] | Assignee | Massachusetts Institute of Technology<br>Cambridge, Mass. |

[54] POLARIZED LIGHT BINOCULAR MICROSCOPE
4 Claims, 2 Drawing Figs.

[52] U.S. Cl. ........................................................ 350/14,
350/13, 350/15, 350/159
[51] Int. Cl. ...................................................... G02b 5/30
[50] Field of Search ............................................. 350/14, 15,
146; 350/12—15, 87—89;

[56] References Cited
UNITED STATES PATENTS

| 3,007,371 | 11/1961 | Tallman | 350/15 |
| 2,255,631 | 9/1941 | Schulman | 350/15 |
| 2,078,181 | 4/1937 | Land | 350/15X |
| 2,809,555 | 10/1957 | Kossel | 350/14 |
| 2,944,463 | 7/1960 | Rantsch | 350/15 |
| 3,405,990 | 10/1968 | Nothnagle et al | 350/15 |

Primary Examiner—David Schonberg
Assistant Examiner—Paul R. Miller
Attorneys—Thomas Cooch, Martin M. Santa and Joseph J. Alekshun, Jr.

ABSTRACT: The beam-splitting cube of binocular microscopes produces light polarized by reflection. A single calibrated polarizing filter between the light source and a specimen being observed can be rotated to maximize or minimize the effect of the 90° phase difference in the two oculars. A further convenience is that a birefringent substance can be localized within a significant structure by simultaneous, binocular viewing of light and dark fields.

PATENTED JUN28 1971   3,588,219

INVENTOR:
DEAN LUSTED
BY *Martin M. Santo*
ATTORNEY

POLARIZED LIGHT BINOCULAR MICROSCOPE

This invention was made in the course of work performed under a National Institute of Health Fellowship.

PRIOR ART

The beam-splitting mechanism of binocular microscopes has the inherent quality of producing polarized light. It is this design that can make polarization microscopy convenient.

The information that polarization microscopy has to offer for the interpretation of the daily slides is curtailed as a result of inconvenience. The typical microscopy used in routine hospital microscopy is not equipped with built-in polarizer-analyzer filters. Determination of the birefringent qualities of a structure usually requires either interposition of polarizer-analyzer filters in the light path or transfer of the specimen to a polarizing microscope. This constitutes the inconvenience. Therefore, the use of polarized light is largely limited to search (e.g., for silicon in a granuloma) and to identification (e.g., for the type of lipid or foreign body).

Polarization microscopy offers other advantages. Structural detail often can be observed in either stained or unstained specimens. Tissue stresses, thickness, and fiber direction can be inferred. Certain aspects of structures too small for resolution by light microscopy can be studied (e.g., alignment of asymmetric proteins). Not the least of the benefits are the kaleidoscopic pleasures inseparable from polarization microscopy.

THE INVENTION

During a comparative study of tissues with a binocular microscope, a Bausch and Lomb Dynazoom Photobinocular Microscope, equipped with polarizer-analyzer plates, it was observed that the light intensities from the right and left oculars were unequal. This inequality was not apparent in nonpolarized light studies. This suggested the possibility that the prismatic splitting of the light beam was effecting polarization by reflection; moreover, the polarization appeared to be 90° out of phase in the two oculars.

A simple test of this effect was arranged as follows: a polarizing filter 28 was made from a disc of Polaroid Neutral Linear Polarizer, Type HN 32, to fit into a Kodak Series VI Adapter Ring. The ring was marked off at 10° intervals and labeled. These ring marks were indexed by a mark placed on the base illuminator orifice. No other polarization filter was used. Alternate readings from the right and left oculars were recorded from an MB Electronics photometer. The photometer was adjusted to read relative intensity by using a constant light source and a constant meter range. The meter was adjusted to register zero in total darkness and to register approximately an 80 percent deflection at the ocular's maximal light intensity.

Figure 1:
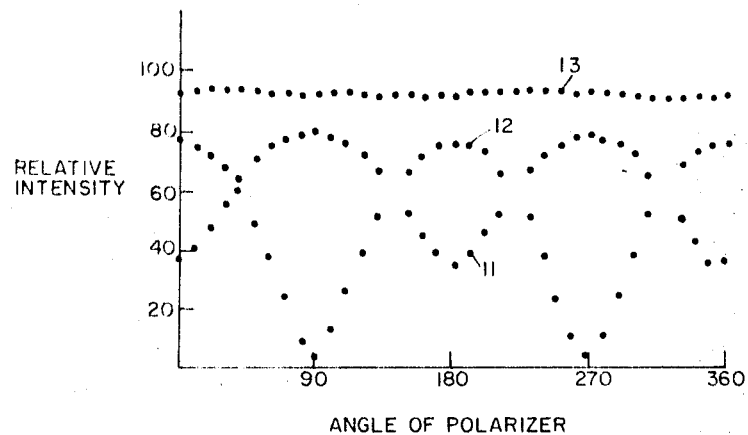
FIG. 1 is a graph showing the polarization of the left and right oculars of a beam-splitting cube type of binocular microscope.

FIG. 1 is a graph of the relative intensities of the light from the right 11 and left 12 oculars as the polarizer plate was rotated through 360° in increments of 10°. The oculars show a 90° phase difference; when the left ocular is at extinction the right ocular is passing its maximal light, and vice versa. It may be observed that the left ocular shows the greater extinction, although the right and left maxima are essentially the same.

The polarization of the light coming from the base illuminator 21, 25 is relatively insignificant. Graph 13 was obtained by maintaining the above settings and procedure, except that the ocular photometer was placed over camera orifice 22, and the inclination prism 23 was shifted out of the light path. This left a straight light path 24 from the source 21, with the exception of the reflection from the base illuminator 45° mirror 25. When a more sensitive photometer setting was used, however, a definite polarization from the base illuminator mirror 25 was measurable and it was essentially in phase with the light from the right ocular 26.

Figure 2:
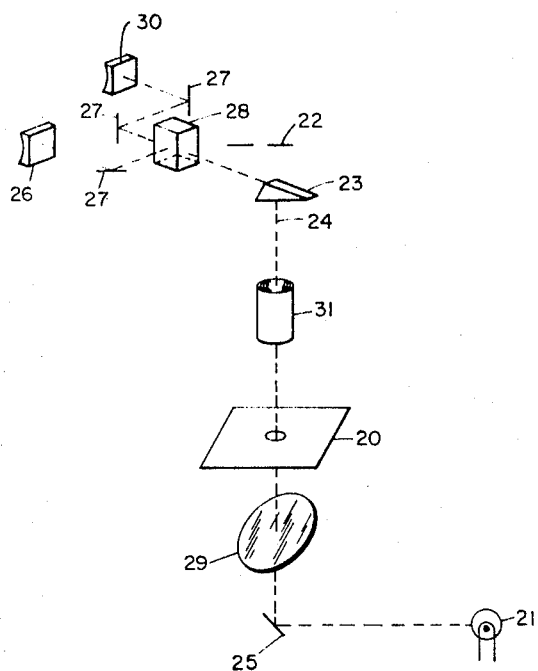
FIG. 2 is a diagrammatic view of a binocular microscope fitted with a rotatable polarizer.

FIG. 2 is a diagrammatic view showing the light path in a binocular microscope similar to that used in obtaining the above data. All mirrors 25, 27 are set at angles of 45° to the light path 24. The inclination prism 23 and the beam-splitting cube 28 are made of glass, with an index of refraction $n$ of 1.57950 for a sodium source of 5893 A. In this case the angle of polarization would be 57°, 40 min. Polarization from the mirrors 25, 27 and the inclination prism 23 would be relatively minor in comparison with the beam-splitting cube 28.

In several recent models of binocular microscopes, the beam-splitting cube is made up of two right-angle prisms joined by cement and a multilayer coating. Both the beam-splitter per se and multilayer have polarization attributes. In the case of the beam-splitter without a multilayer coating, unpolarized light reflected at the boundary of two insulating media is polarized to some degree in the plane of incidence. The refracted light is always partially polarized in a plane perpendicular to the plane of incidence. The multilayer can act as an efficient polarizer similar to a stack of glass plates, where each surface increases the percentage of the total polarization-by-reflection of the incident light. The nature of this film is such that the transmitted and reflected components are almost completely plane polarized and are perpendicular.

Since the beam-splitter coatings in use are tilted with respect to the incident beam, they reflect polarized light of different azimuths unequally. The reflectance for the $s$-component, vibrating at right angles to the plane of incidence, is always greater than that for the $p$-component, in the plane of incidence. The reflectance of unpolarized light is the average of these.

A multilayer film usually consists of two or more contiguous layers of zinc sulfide and magnesium fluoride deposited on a base material in order to attain a high efficiency of light transfer at a surface. By variation of the material, thickness, and number of layers, multifilms may be designed for specificity of function, including heat control filters, color separating filters, first surface mirrors, and neutral beam dividers. Because the thickness is no greater than $30\mu$ in. in the most complicated design of a multifilm, reflection or transmission of light is accomplished with virtually no absorption of energy.

The neutral beam-divider cube has a multilayer film that is deposited on the diagonal surface of a glass cube made of two right-angle prisms cemented together. Since the light-handling properties of this junction lie primarily within the multifilm, the cement plays no significant role. There is insignificant loss of light by absorption in these beam-splitters; the sum of the intensities of the reflected and transmitted beams is essentially equal to the intensity of the incident beam. At an angle of incidence of 45° the cube has a reflectance to transmittance ratio of 45 to 55. No color difference in the transmitted and reflected light is perceptible.

The use of multifilm in the beam-dividing cube has been adopted by several companies, including Bausch and Lomb, Leitz, and Carl Zeiss. The latter firm has compensated for the polarizing effects by insertion of quartz plates in the binocular tubes. In general, one might expect to find no multifilm cube in a microscope produced before 1959. A lesser polarization effect, however, can be seen in binocular microscopes without a multilayer cube. In these models the small amount of polarization is generally greater in the right ocular than in the left ocular.

Polarized light resulting from beam splitting is a useful effect for several reasons. First, only one polarizing filter 29 has to be inserted in the light path 24, and it can be left in place as an integral part of the optics. The beam-splitting cube 28 of definite orientation is a fixed analyzer for the rotation of the polarizing filter 29. This rotation permits calibration of the polarizer to indicate both maximal contrast and equality of light intensity in the right 26 and left 30 oculars. When polarization microscopy is not indicated, the polarizer 29 is rotated to the index for equality of intensity in the right 26 and left 30 oculars. For study of a specimen, the polarizing filter 29 is placed between the specimen support 20 and the mirror 25. Unit 31 is the magnifying lens system found in conventional microscopes.

That this polarization effect should occur in the left and right oculars of a binocular microscope is most fortunate. Since the polarization of the oculars has 90° phase difference, it permits simultaneous comparison of one visual field with crossed and parallel positions of the rotatable polarizing filter 29. The problem often arises of whether the gleaming birefringent particle seen in the dark field is located within a significant structure (e.g., is the foreign body within a macrophage?). Simultaneous binocular observation superimposes the dark and light fields so that the birefringent particle is clearly localized with respect to adjacent structures. The photomicrographs of FIG. 3 are illustrative of the results obtained by rotation of the polarization filter 29.

Rotation of the polarization filter 29 to the extinction angle for the left ocular 30 obscures histologic detail. At the same filter angle of rotation, normal detail may be seen in the right ocular 26. Binocular viewing fuses these identical fields; the information which each field offers becomes complementary.

Although the invention has been described using a binocular microscope in which 90° difference in polarization in the oculars is obtained from a beam-splitting cube 28; it is apparent that in the event a beam-splitter is used which does not produce significant polarization, a polarizing filter in each ocular oriented at 90° polarization with respect to each other will produce the same effect. These ocular filters can be made of the same material as that used in the rotatable filter 29.

While there has been described a preferred embodiment of this invention, various embodiments will occur to those skilled in the art without departing from the scope of the invention.

I claim:

1. A binocular microscope comprising:
   means for providing polarized light to each ocular of said binocular microscope;
   said polarized light in each ocular being substantially 90° out of phase with each other;
   a rotatable polarizer filter having a single plane of polarization;
   a specimen support located between said ocular polarizing means and said rotatable polarizer; and
   means for providing light to said rotatable polarizer, the polarized light from said rotatable polarizer passing through said specimen support to said ocular polarizing means.

2. The apparatus of claim 1 wherein said means for providing polarized light to said oculars comprises a multifilm beam-splitting cube between said oculars and said specimen support.

3. The apparatus of claim 1 wherein said means for providing polarized light to each ocular comprises a first linear polarizing filter in only the light path of the right ocular and a second linear polarizing filter in only the light path of the left ocular, said first and second polarizing filters being oriented with respect to each other to allow light to pass to said right ocular which is polarized at substantially at 90° with respect to the light passing to said left ocular.

4. The apparatus of claim 1 wherein said light providing means provides substantially unpolarized light.